UNITED STATES PATENT OFFICE.

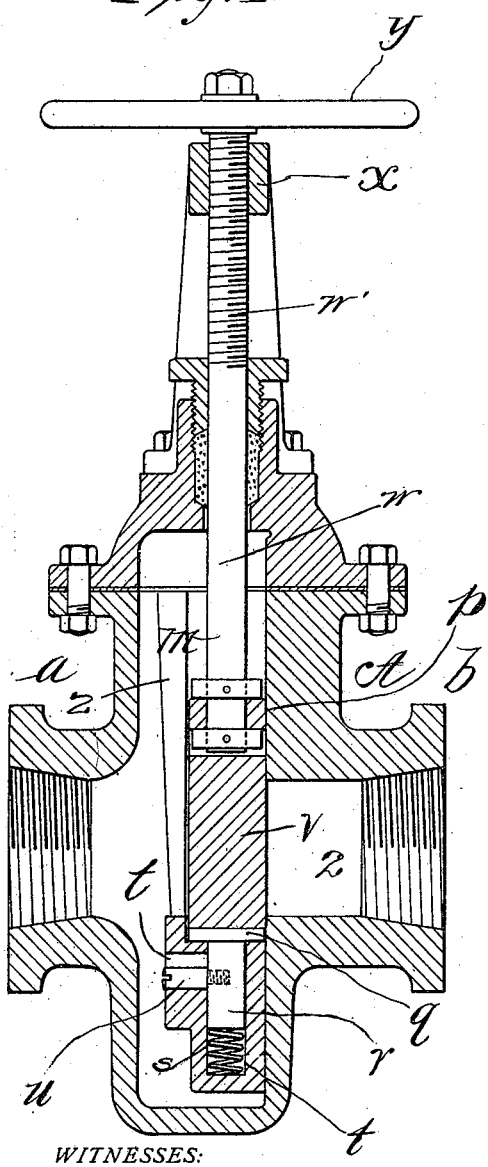

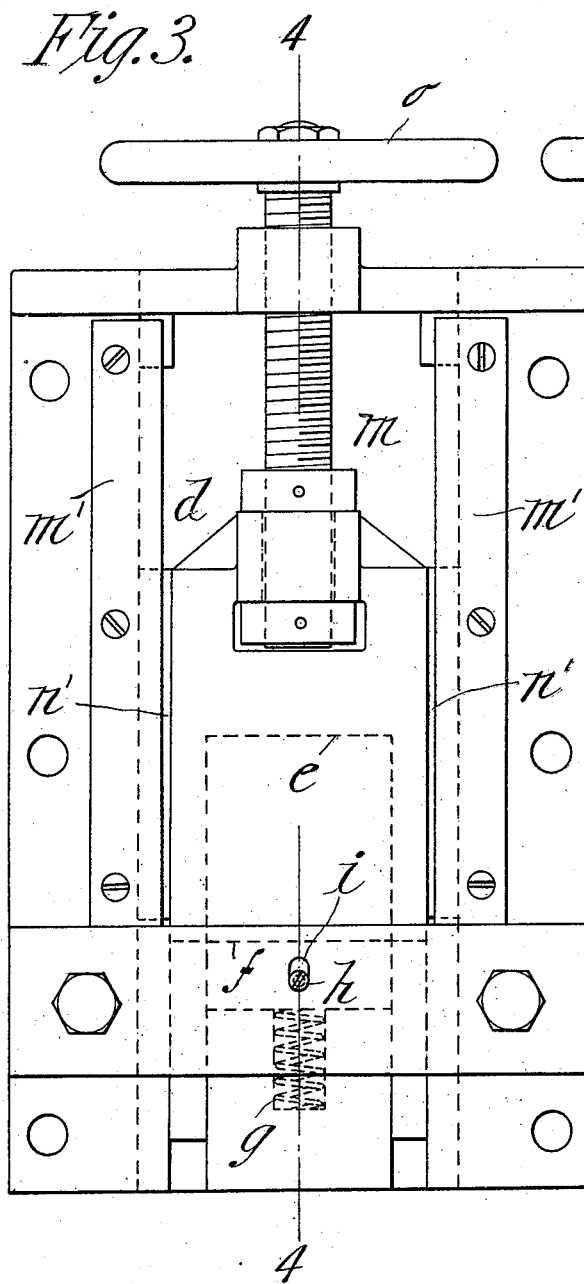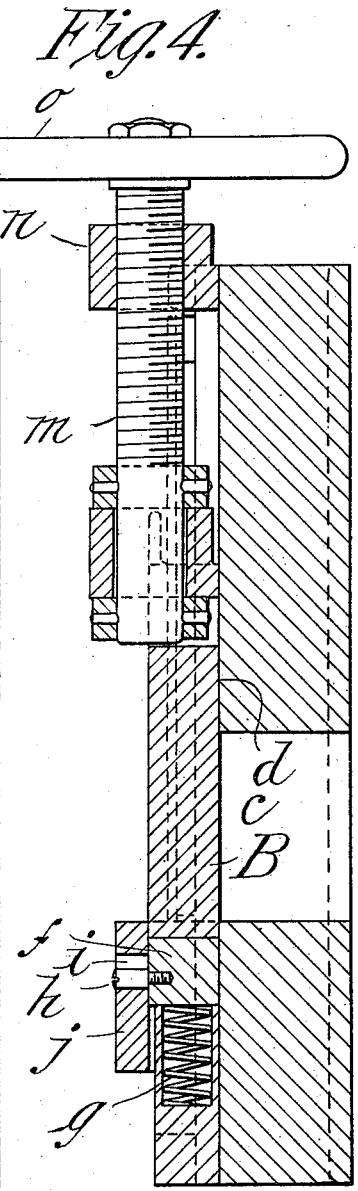

ANDERS P. KJÖLLER, OF SOUTH HADLEY, MASSACHUSETTS.

SEATING ARRANGEMENT FOR STEAM AND OTHER VALVES.

975,046.

Specification of Letters Patent.

Patented Nov. 8, 1910.

Application filed January 27, 1909. Serial No. 474,616.

*To all whom it may concern:*

Be it known that I, ANDERS P. KJÖLLER, a citizen of the United States of America, and resident of South Hadley, in the county of Hampshire and State of Massachusetts, have invented certain new and useful Improvements in Seating Arrangements for Steam and other Valves, of which the following is a full, clear, and exact description.

The object of this invention is to improve valves of various kinds, and more particularly steam valves, and especially in respect of the seating portions so that the closing edge of the valve, when the valve is closed, has a location below or beyond the margin of the steam or fluid way, in consequence of which the edge or end of the valve cannot become "lapped out" ragged or reduced to result in an imperfect seating and a leakage through the valve.

The invention consists in the combination and arrangement of parts as hereinafter described in conjunction with the accompanying drawings and as set forth in the claims.

In the drawings:—Figure 1 is a section of view through a valve embodying the present improvements; Fig. 2 is an elevation of the valve: Fig. 3 is a face view of principal portions of a valve in which the improvements are embodied showing slight modifications of construction, and Fig. 4 is a sectional view on line 4—4, Fig. 3.

In the drawings,—A represents a valve body having a steam or other fluid way therethrough, at opposite portions of which are coupling connections $a$ and $b$ for inlet and outlet. In the form shown in Figs. 1 and 2 the casing A has a plane face $p$ at one side of the outlet opening 2, and below said opening is a seat $q$ having a stem $r$ engaged in the upright leg of the L-socket $t$, there being a spring $s$ in the socket bearing against the stem to force it and thus the seat upward, a stud $u$ projecting from the stem and working in the other leg of the socket $t$ and serving to limit the upward movement of the stem and seat and retaining the seat at all times in a position below the outlet opening 2.

A valve $v$ located in the casing against the face $p$ normally serves as a closure for the outlet opening 2, and to reciprocally move the valve I employ the valve stem $w$ extending upward from the casing through suitable packing and having a threaded portion $w'$ engaged in a threaded socket in the extension $x$ of the casing, the stem $w$ being provided with a hand wheel $y$ for turning the same, the lower end of said stem being rotatably secured to the valve and its threaded engagement in the socket serving to shift it and thus the valve, guides $z$ engaging the side of the valve to guide the same and retain it in contact with the face $p$.

When the valve is opened the seat rises upward until the stud strikes the top of the socket $t$, the continued movement of the valve raising it above the seat and opening the outlet port 2, while as the valve is being closed it strikes the seat and forces it downward, the spring holding the seat in tight engagement with the valve and insuring close engagement therebetween even after the parts have become worn.

In Figs. 3 and 4 I have illustrated a valve embodying the same principles as the form shown in Figs. 1 and 2 but showing slight modifications of construction.

The valve comprises a vertical plane face wall $d$ at one side of the outlet opening $c$ below which is a follower $f$ which is pressed in an upward direction, or toward the margin of the outlet, by a spring $g$ in a socket therefor. The stud $h$ affixed to the follower and working in a slot $i$ in a wall $j$ bordering the socket in which the follower works, limits the extent of spring pressed movement of the follower,—the edge of which follower, against which the valve proper B seats being always below the lower margin of the outlet way.

The valve has a stem $m$ for operating it, which in the present instance has a screw engagement through a suitable screw tapped lug or portion $n$ of the valve body, said stem being provided with a hand wheel $o$ or equivalent means for turning it.

When the valve is raised through the turning of its valve stem, its initial opening movement is followed by the part $f$ which remains in contact therewith until such part $f$ has its movement limited by the engagement of the stud $h$ against the upper boundary of the slot $i$, after which the further movement of the valve to leave the outlet way more or less open is away and in separation from the seat receiving surface of the follower. The valve in its closing, after having its edge brought below the lower boundary of the outlet way, comes to contact against the spring pressed follower and thereafter has a degree of movement forcing the follower downwardly against the spring so that the lower edge of the valve is ensconced in a pocket therefor and is protected against lapping out action of the steam or fluid in pressure thereagainst and will remain intact and for assuring a perfect seating of the valve for an indefinite period.

The valve B, as shown in the enlarged detailed views of the inner portion of the valve as illustrated in Figs. 3 and 4, is constrained for its movements closely facewise relatively to the wall $d$, through which the outlet passage leads by the provision of undercut parallel side strips $m', m'$ on the wall within which edge tongues or reduced portions $n', n'$ of the gate valve are closely fitted for sliding movements.

It will be appreciated in consideration of the construction and arrangements of parts hereinabove described, that the edge of the valve proper on occasion is moved to an opening relation relatively to the outlet way, while, when closed, is so disposed as not to be subjected to the action of attrition by the steam or other fluid to become worn or irregular at its closing edge; and, furthermore, that even if after unusually protracted use the closing edge should become ragged or worn, even then an efficient closure of the waterway through the valve remains possible.

I claim:—

1. In a device of the character described, the combination with a casing having inlet and outlet openings, of a reciprocally movable valve mounted therein, means projecting from the casing for controlling the movement thereof, guides for retaining the valve in position, the valve having grooves formed therein in which said guides are received, a yieldably mounted seat for said valve, and means carried by the seat and engaged in a recess formed in the casing for limiting the movement of the seat.

2. In a device of the character described, the combination with a casing having a socket formed therein and a recess formed in the casing adjacent the socket and extending at right angles thereto, of a valve seat mounted in the casing above the socket, a spring mounted in the socket and bearing against the seat, a valve mounted in the casing and adapted to bear down upon the seat, and an abutment carried by the seat and engaged in the recess in the casing for limiting the movement of the seat.

3. The combination with a valve body, having a fluid way therethrough, comprising a wall through which the outlet way leads and said body comprising a socket below the margin of the outlet way with a slot in the wall of said socket, of a gate valve facewise movable at the inner side of the outlet way on said wall across and beyond the margin of said way, means for constraining the valve in its facewise relation to said wall, and means for operating the valve, and a follower in said socket having an edge thereof against the face of said wall, adjacent the outlet, a stud provided on the follower and engaging through said slot, and a spring for forcing the follower in a direction toward the margin of the outlet way.

Signed by me at Springfield, Mass., in presence of two subscribing witnesses.

ANDERS P. KJÖLLER.

Witnesses:
Wm. S. Bellows,
G. R. Driscoll.